Figures 1, 2:
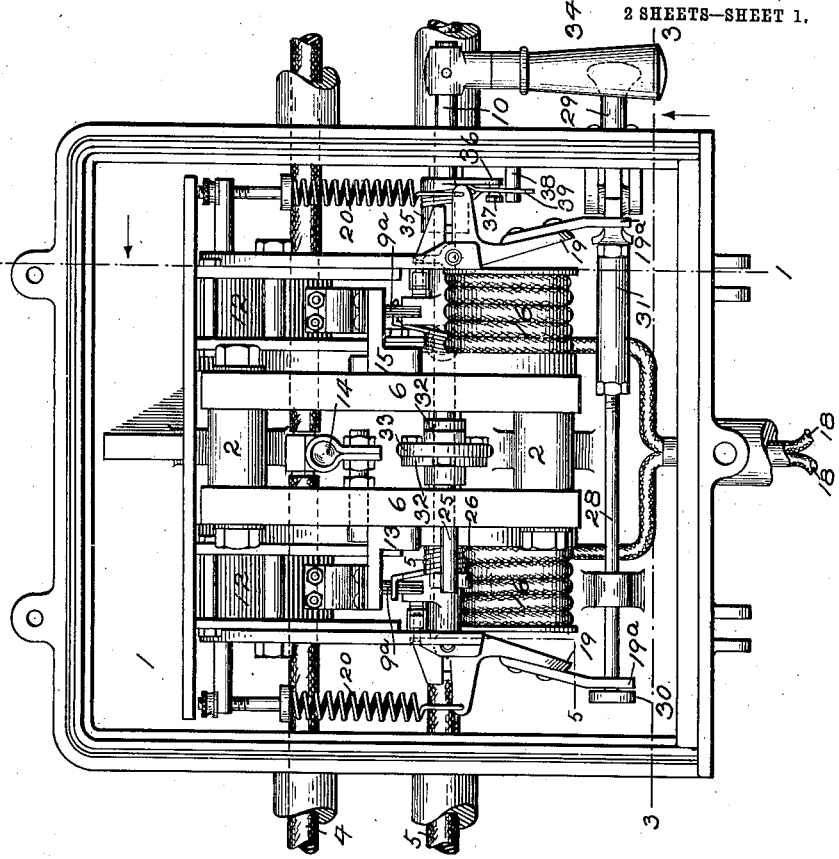

M. W. DAY.
CIRCUIT CONTROLLING MECHANISM.
APPLICATION FILED OCT. 17, 1906.

935,092.

Patented Sept. 28, 1909.

2 SHEETS—SHEET 1.

WITNESSES

Marcus L. Byng.

George A. Thornton.

INVENTOR

MAXWELL W. DAY.

by Albert G. Davis

Atty.

M. W. DAY.
CIRCUIT CONTROLLING MECHANISM.
APPLICATION FILED OCT. 17, 1906.
935,092.
Patented Sept. 28, 1909.
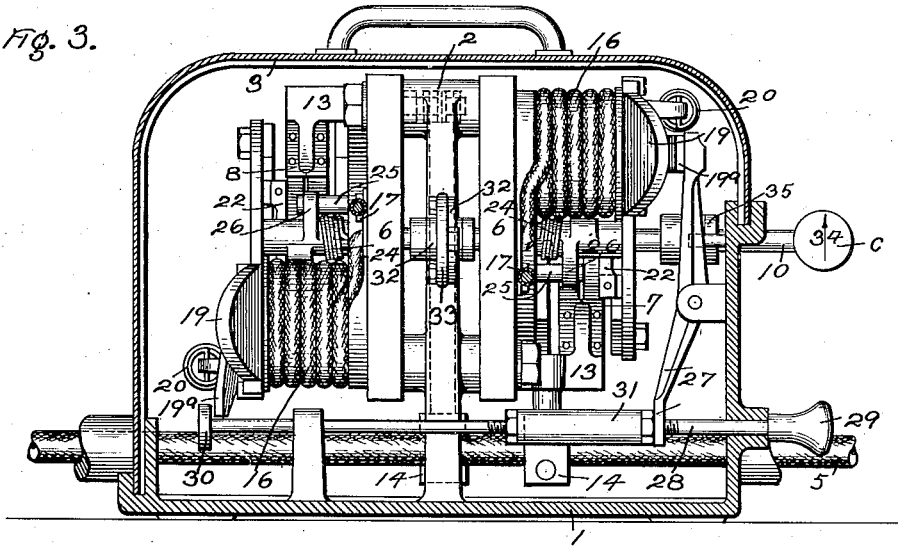
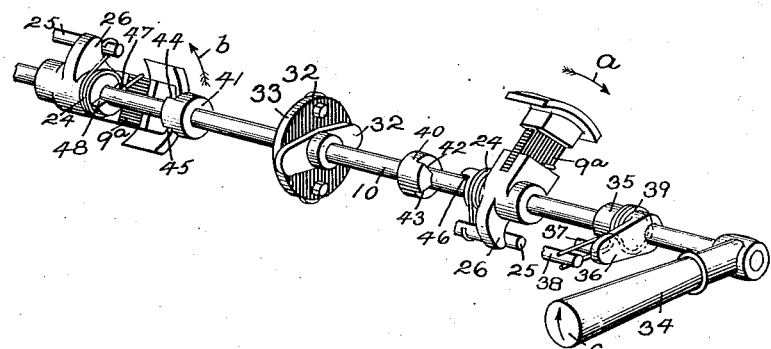
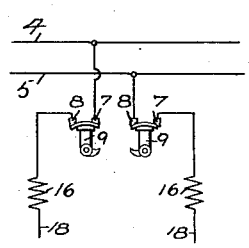
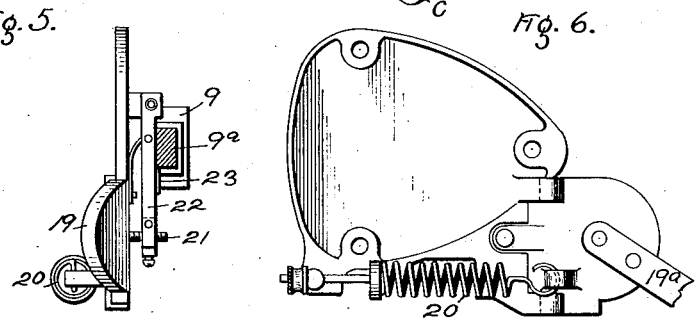
WITNESSES
Marcus L. Byng.
George L. Thornton.
INVENTOR.
MAXWELL W. DAY.
Albert G. Davis
by                      Atty

UNITED STATES PATENT OFFICE.

MAXWELL W. DAY, OF SCHENECTADY, NEW YORK, ASSIGNOR TO GENERAL ELECTRIC COMPANY, A CORPORATION OF NEW YORK.

CIRCUIT-CONTROLLING MECHANISM.

935,092.  Specification of Letters Patent.  Patented Sept. 28, 1909.

Application filed October 17, 1906.  Serial No. 339,319.

*To all whom it may concern:*

Be it known that I, MAXWELL W. DAY, a citizen of the United States, residing at Schenectady, county of Schenectady, State of New York, have invented certain new and useful Improvements in Circuit-Controlling Mechanism, of which the following is a specification.

This invention relates to circuit-controlling devices which automatically open an electric circuit in case the amount of current flowing therein is abnormal, and more particularly to devices of this class which are arranged to prevent the closing of the circuit when there is an overload upon the circuit.

It has been proposed to connect an automatic circuit-breaker and a switch in series, the arrangement being such that the automatic circuit-breaker is first closed and then the circuit is closed by means of the switch.

In carrying out my invention two automatic circuit-breakers are connected in the circuit to be controlled and are provided with common operating means so that either circuit-breaker may be closed and the circuit may then be completed by closing the other breaker. In case an overload exists upon the circuit the breaker which was first closed will be automatically tripped and will immediately open the circuit, so that it is impossible to keep the circuit closed as long as the overload persists. If desired, an automatic circuit-breaker may be connected in each lead of the circuit to be controlled, so that all leads are protected, a common operating means for the circuit-breakers being provided as above described.

The object of the invention is to provide a circuit-controlling device by means of which the closing of the circuit is rendered impossible in case conditions are such that the closing of the circuit will produce an abnormal flow of current therein; to arrange a mechanism operated by a rocking handle so that the circuit is closed by two movements of the handle in different directions, regardless of the direction in which the first movement is made; to cause the operating handle to automatically assume a neutral position when released by the operator; and in general to improve the construction of devices of this type as more specifically pointed out in the claims.

The invention will best be understood by reference to the accompanying drawings, showing one form in which the invention may be embodied, in which—

Figure 1 is a sectional view on the line 1, 1, of Fig. 2; Fig. 2 is a plan view of the controlling mechanism with the top of the casing removed to show the arrangement of the parts; Fig. 3 is a sectional view on the line 3, 3, of Fig. 2; Fig. 4, a view in perspective of the operating shaft with the movable contacts displaced to show the lost motion connections between the shaft and the contacts; Fig. 5 a sectional view on the line 5, 5, of Fig. 2 showing the tripping mechanism; Fig. 6 a plan view of the left end of the mechanism shown in Fig. 3, with the cover removed; and Fig. 7 a diagram showing the connections between the main circuit and the branch circuit.

My invention may be embodied in various forms, but I have shown it applied to two automatic circuit-breakers which are so arranged that they will automatically open in case an abnormal current is flowing through the circuit. These circuit-breakers are mounted in a casing 1 carrying posts 2 to which the circuit-breakers are firmly secured by means of bolts or other suitable fastenings. A cover 3 for the casing is provided which incloses the circuit-breakers and the operating mechanism so as to protect the entire device. Leads 4 and 5 of the main circuit pass through the casing and are connected through the circuit-breakers with the branch circuit to be controlled.

In the arrangement shown in the drawings, two circuit-breakers of the same construction are used. Each circuit breaker is mounted upon a base 6, preferably of insulating material, and bolted to the posts 2. The base carries fixed contacts 7 and 8 with which a bridging contact 9 coöperates, the bridging contact being carried upon an arm 9ª, preferably of insulating material, mounted upon an operating shaft 10. Arcing tips 11 of copper or other suitable material, are mounted vertically above the fixed contacts 7 and 8 upon the walls 12 of an arc-chute by means of which the arc formed when the circuit is opened is directed away from the operating mechanism of the circuit-breaker. Clips 13 carrying the fixed contacts 7, are firmly secured to the base 6 and are in electrical connection by means of connectors 14 with the main leads 4 and 5. Clips 15 carrying the fixed contacts 8 are secured to the base and are each connected to one end of the windings of overload coils 16, the other ends of the windings being connected to terminals 17, to which the leads 18 of the branch circuit are secured. Each overload coil is provided with a pivoted armature 19 which is held in normal position by an adjustable spring 20.

As shown in Figs. 5 and 6, each armature is provided with a lug in which is loosely mounted a screw 21 connected to a pivoted latch 22 carrying a trip-plate 23 which engages the arm 9$^a$, and holds the bridging contact 9 in a position to close the circuit. When the parts are in the position shown in Fig. 5 the arm 9$^a$ tends to move toward the screw 21, which tendency is resisted by the trip-plate 23, which is in engagement with the arm 9$^a$. If the pivoted latch 22 is moved to the left in Fig. 5, the trip-plate moves out of engagement with the arm 9$^a$, which is then left free to move toward the screw 21. A spiral spring 24 surrounds the hub to which the arm 9$^a$ is secured, one end of the spiral spring engaging a stop 25 carried by the casing, and the other end engaging the arm 9$^a$. The hub to which the arm 9$^a$ is secured is provided with a heel 26, and the spiral spring 24 tends to throw the heel into engagement with the stop 25 in which position the bridging contact 9 is out of engagement with the fixed contacts 7 and 8 and the circuit is opened. When the circuit is closed by moving the bridging contact into engagement with the fixed contacts, the spiral spring 24 is put under tension and the trip-plate 23 engages the arm 9$^a$ and locks the bridging contact. If an overload occurs upon the circuit, the armature 19 is attracted by the overload coil and by means of the screw 21 pulls the latch 22 and trip-plate 23 out of engagement with the arm 9$^a$. When this occurs the spring 24 throws the bridging contact 9 out of engagement with the fixed contacts and the circuit is automatically opened. By placing an automatic circuit-breaker in each lead of the circuit complete protection is assured, since, if an abnormal current flows in either lead, the circuit breaker in that lead will open, regardless of the amount of current in the other lead.

Each armature 19 is provided with an extension 19$^a$, and a lever 27 is pivoted to the casing in such a position that one end of the lever engages the extension 19$^a$ of one of the armatures. A trip-rod 28 is slidably mounted in the casing and is provided with a projecting operating knob 29. The trip-rod carries a shoulder 30, at one end and a sleeve 31 is adjustably mounted on said rod. The shoulder 30 engages the extension 19$^a$ of one of the armatures, while the sleeve 31 engages one end of the lever 27, the other end of which engages the extension on the other armature. When the trip-rod 28 is moved to the right by means of the knob 29, both armatures are moved toward their respective overload coils and the circuit breakers are tripped open in the same manner as though the armatures had been attracted by the coils. As a result of this arrangement the circuit may be opened by hand if desired.

A common operating means for the circuit-breakers, consisting of a rod 10 extends through the casing and is suitably journaled therein. The rod consists of two sections placed end to end, each section carrying a cross-arm 32 rigidly secured thereto, and the cross-arm 32 being bolted to a plate 33 of insulating material. As a result of this construction, the sections of the operating shaft are rigidly secured together mechanically so as to form a single shaft, but the sections are insulated from each other electrically. On one end of the shaft an operating handle 34 is keyed, by means of which the shaft may be rocked for the purpose of operating the circuit-breakers. A hub 35 is rigidly secured to the shaft near the operating handle, this hub carrying an arm 36 rigidly secured thereto. A pin 37 is mounted in the arm, while a corresponding pin 38 is rigidly carried by the casing. A spiral spring 39 surrounding the hub 35 has its ends extended parallel to each other and passing over both the pins 37 and 38. As a result of this arrangement the spring tends to bring the pins 37 and 38 into line with each other and if the arm 36 is moved in either direction the spring 39 is put under strain. Operating sleeves 40 and 41 are rigidly secured to the operating shaft so that the movable contacts 9 may be moved to operative position by means of the shaft. The operating sleeve 40 is provided with a lug having surfaces 42 and 43, while the operating sleeve 41 is provided with a lug having surfaces 44 and 45. The lug on the operating sleeve 40 coöperates with a shoulder 46 on the hub which carries one of the movable contacts, while the lug on the operating sleeve 41 coöperates with the shoulder 48 on the hub which carries the other movable contact. This hub also has another shoulder 47, and the other hub has a corresponding shoulder not shown in Fig. 4. The width of these lugs is considerably less than the distance between the shoulders with which they coöperate, and the other shoulders on the hubs, so that there is a lost-motion connection between the operating shaft 10 and the hubs which carry the movable contacts of the circuit-breakers.

The operation of the device is as follows: If it be assumed that the circuit-breakers are open, the movable contacts will be in the position shown in Fig. 4, in which position the heels 26 are in engagement with the stops 25, when the parts of the mechanism are in normal relation. As shown in that figure, the operating handle 34 is held in its normal position by the action of the spiral springs 39 upon the pins 37 and 38. If it be desired to close the circuit, the operating handle 34 may be rotated to the right in the direction of the arrow c. The result of this movement will be the engagement of the surface 42 with the shoulder 46, thereby establishing a rigid connection between the operating shaft 10 and one of the movable contacts 9. As the operating handle 34 is moved in the direction of the arrow c, the movable contact 9 is moved in the direction of the arrow a into engagement with the fixed contacts. When the movable contact reaches this position it is locked by means of the latch 22, as hereinbefore explained. The operating handle 34 is now moved in a direction opposite that of the arrow c, leaving the movable contact 9 in a circuit-closing position, and causing the surface 42 to move away from the shoulder 46. When the operating handle reaches its normal position as shown in Fig. 4, the surface 45 comes into engagement with the shoulder 48 and further movement of the operating handle 34 in a direction opposite to that of the arrow c, causes the other movable contact 9 to be moved in the direction of the arrow b to circuit-closing position. This movement closes the circuit, and if the conditions are normal, the second movable contact is locked in circuit-closing position by its latch 22. When the operating handle 34 is released, the spring 39 returns it to normal position, as shown in Fig. 4, and the circuit remains closed, since the movable contacts of both circuit-breakers are in engagement with their fixed contacts. If an overload should occur upon the circuit, the armature 19 would be attracted and the circuit-breakers would open the circuit. If, however, conditions upon the circuit were such that when the circuit is closed an abnormal current flows therein, the abnormal current would begin to flow as soon as the second movable contact, which was moved in the direction of the arrow b, engaged its fixed contacts, thereby completing the circuit, and as a result of the abnormal current, the overload coil controlling the first movable contact would be energized, thereby permitting the spring 24 to move the contact to open the circuit. This movement is possible since at the time the circuit is finally closed by moving the second contact in the direction of the arrow b, the space between the surface 42 and the shoulder 46 is more than sufficient to permit the first movable contact to move in a direction opposite the arrow a and into engagement with its stop 25.

It is evident that it makes no difference whether the operating handle is first moved in the direction of the arrow c or in an opposite direction, since it is immaterial which circuit-breaker is first closed, and therefore, two movements of the operating handle will always close the circuit, so that no delay is occasioned if the operator should first move the operating handle in one direction rather than the other. It is furthermore apparent that it is impossible for the operator to hold the circuit closed, since after closing one circuit-breaker it is necessary to move the operating shaft entirely out of operative engagement with that circuit-breaker in order to close the other. The operating handle is returned to its normal position by means of the spring 39, and hence, when the circuit is to be closed, the operating means is always found in the same position.

It is evident that my invention may be embodied in many other forms than that shown and described, and I therefore, do not wish to be restricted to the particular form herein shown, but intend to cover by the claims all changes and modifications which are within the spirit and scope of my invention.

What I claim as new and desire to secure by Letters Patent of the United States, is,—

1. In a circuit controlling mechanism, the combination with a plurality of circuit breakers automatically opened by abnormal variations of current in the circuit, of a common operating member biased to a neutral position in inoperative relation to said circuit breakers and movable at will from said neutral position, and connections between said member and said circuit breakers whereby said member may be brought into operative relation to any of said circuit breakers by movement of said member and thereby any of said circuit breakers may be closed independently of the others.

2. In a circuit controlling mechanism, the combination with a plurality of circuit breakers automatically opened by abnormal variations of current in the circuit, of a common operating member biased to a neutral position in inoperative relation to said circuit breakers and movable at will from said neutral position, and a lost motion connection between said member and each of said circuit breakers, whereby said member may be brought into operative relation to any of said circuit breakers by movement of said member and thereby any of said circuit breakers may be closed independently of the others and be left free to open when said member is in inoperative relation thereto.

3. In a circuit controlling mechanism, the combination with a plurality of circuit breakers automatically opened by abnormal variations of current in the circuit, of a common operating member biased to a neutral position in inoperative relation to said circuit breakers and movable at will from said neutral position, connections between said member and said circuit breakers whereby said member may be brought into operative relation to either of said circuit breakers by movement of said member and thereby either of said circuit breakers may be closed independently of the other, and manually operated means for simultaneously tripping both circuit breakers.

4. In a circuit controlling mechanism, the combination with two circuit breakers automatically opened by abnormal variations of current in the circuit, of common operating means normally in neutral position to leave both circuit breakers free to open and movable in either direction from said neutral position to close either circuit breaker independently of the other, and means for automatically returning said operating means to neutral position.

5. In a circuit controlling mechanism, the combination with two circuit breakers, each automatically opened by abnormal current in the circuit, of an operating member movable in different directions, and a lost motion connection between said member and each of said circuit breakers whereby the movement of said member in one direction closes one circuit breaker independently of the other and movement in the other direction closes the other circuit breaker and leaves the first free to open.

6. In a circuit controlling mechanism, the combination with two circuit breakers, each automatically opened by abnormal current in the circuit, of a rocking operating member for closing either of said circuit breakers and subsequently closing the other circuit breaker.

7. In a circuit controlling mechanism, the combination with two circuit breakers, each automatically opened by abnormal current in the circuit, of a rocking member for closing either of said circuit breakers independently of the other when rocked in one direction and for closing the other circuit breaker and leaving the closed circuit breaker free to open when rocked in the other direction.

8. In a circuit controlling mechanism, the combination with two circuit breakers, each automatically opened by overload when out of engagement with the operating means, of common operating means normally out of engagement with both circuit breakers and movable in either direction into engagement with either circuit breaker to close it and movable in the other direction out of engagement with the closed circuit breaker into engagement with the other circuit breaker to close it.

9. In a circuit-controlling mechanism, the combination with a plurality of switches in circuit, movable elements for said switches movable to circuit-closing position, restraining means for holding said elements in switch-closing position, common operating means for said elements, said operating means engaging the movable element of one of said switches when moved in one direction and engaging the movable elements of the other switches when moved in another direction, and automatic means arranged to actuate said restraining means in response to abnormal current and thereby release said movable elements.

10. In a circuit-controlling mechanism, the combination with two circuit breakers, each comprising a movable element, a latch for holding said element in circuit-closing position, and automatic means for releasing said latch upon overload, of a rock shaft movable in opposite directions for moving said elements to a circuit-closing position, and connections between said rock shaft and said movable elements whereby one element is free from the rock shaft when the other is in engagement therewith.

11. In a circuit-controlling mechanism, the combination with two circuit breakers, each comprising a movable element, a latch for holding said element in circuit-closing position, and automatic means for releasing said latch upon overload, of a rock-shaft, a projection on said rock-shaft for engaging one element when said shaft is rocked in one direction, and a projection on said shaft for engaging the other element when the shaft is rocked in the other direction.

In witness whereof, I have hereunto set my hand this 16th day of October, 1906.

MAXWELL W. DAY.

Witnesses:
BENJAMIN B. HULL,
HELEN ORFORD.